United States Patent Office 3,272,293
Patented Sept. 13, 1966

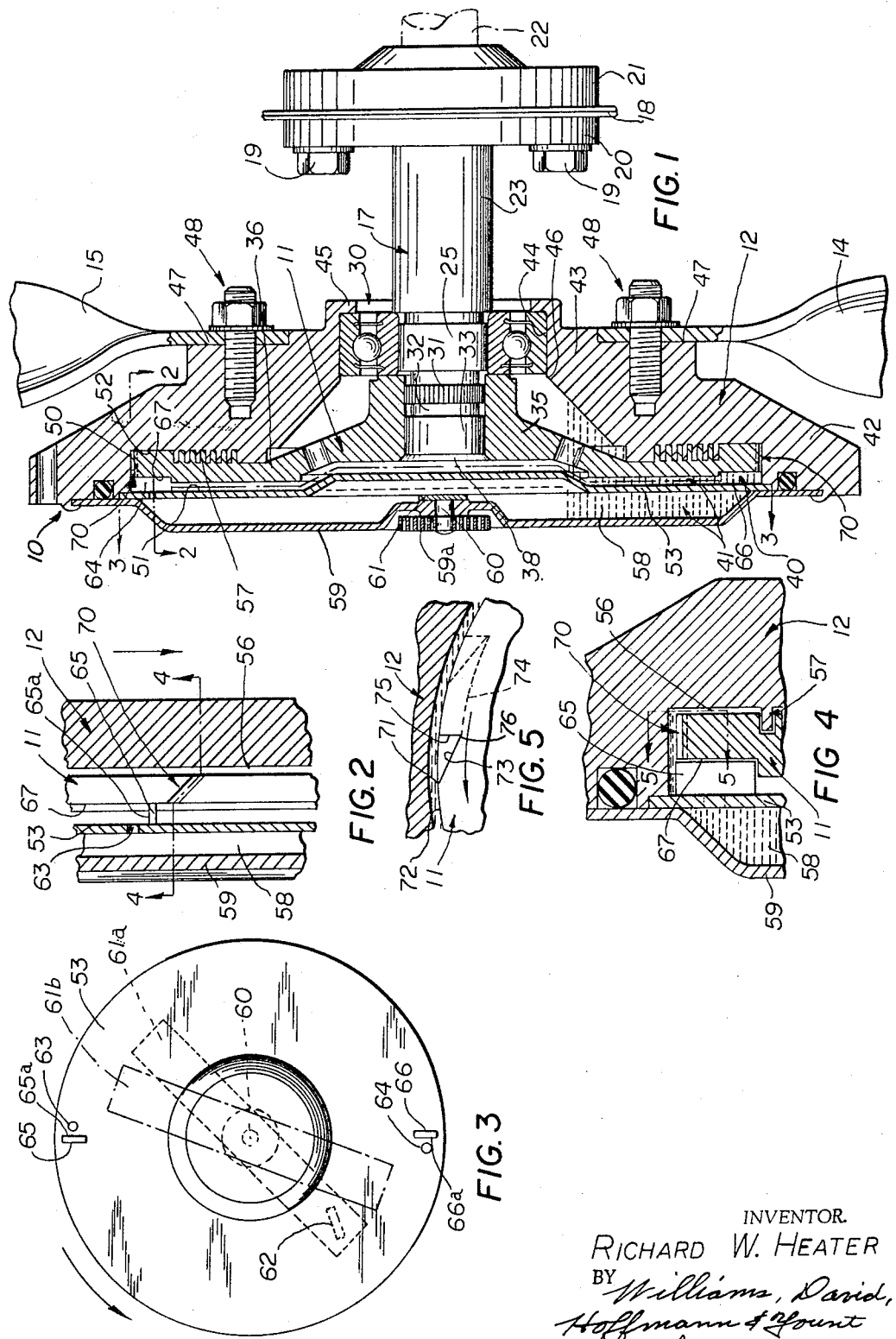

3,272,293
VISCOUS FLUID CLUTCH WITH FLOW
CIRCULATION MEANS
Richard William Heater, Marshall, Mich., assignor to
Eaton Manufacturing Company, Cleveland, Ohio, a
corporation of Ohio
Filed Mar. 2, 1964, Ser. No. 348,572
8 Claims. (Cl. 192—58)

The present invention relates to a drive coupling of the type embodying a fluid medium transmitting torque between relatively rotatable input and output coupling members, and particularly to a shear type fluid coupling wherein a viscous shear fluid medium such as silicone fluid transmits torque between the rotatable coupling members.

The principal object of the present invention is the provision of a new and improved drive coupling of the fluid shear type which is simple in construction, easily manufactured, operable to retard acceleration of the output coupling member upon acceleration of the input coupling member, and capable of achieving an extremely low idle output speed.

A further object of the present invention is the provision of a new and improved fluid coupling employing a viscous shear fluid for transmitting torque from an input member driven by an engine to an output member driving cooling fan blades for the engine, and wherein acceleration of the output coupling member is retarded upon acceleration of the input coupling member so that fan noise lags behind engine noise so that engine noise is sufficient to hide or cover the fan noise.

A further object of the present invention is the provision of a new, improved, simple viscous coupling of the shear type wherein acceleration of the output member is delayed or retarded upon acceleration of the input member through the provision of pumping notch means formed on the periphery of the input member.

A further object of the present invention is the provision of a new and improved fluid coupling having a reservoir chamber and a shear space and wherein shear fluid in the fluid shear space effects transmission of torque between the coupling members and including means for effecting fluid flow from the reservoir chamber to the shear space and pumping slots formed on the outer periphery of the input coupling member and operable to retard or slow the rate of fluid flow into the shear space.

A further object of the present invention is the provision of a new and improved shear type fluid coupling having notch means in the outer periphery of the input coupling member to pump fluid from the shear space to achieve a low idle speed, and wherein an oil bearing for the input coupling member is maintained at idle speed.

A further object of the present invention is the provision of a new and improved shear type fluid coupling having pumping notch means on the outer periphery of the input coupling member for effecting fluid flow axially of the input coupling member.

A further object of the present invention is the provision of a new and improved shear type fluid coupling having pumping notches in the outer periphery of the input member, and extending axially therethrough to effect fluid flow from one axial side of the input member to the other axial side thereof.

A further object of the present invention is the provision of a new and improved fluid coupling wherein the output member carries an impact element which has an axial extent overlapping a part of the axial extent of the input member, and the outermost radially spaced surface or edge thereof is immediately adjacent the surface of the output member defining the operating chamber thereby providing for an effective pumping action so as to reduce the volume of fluid in the operating chamber.

A further object of the present invention is the provision of a new and improved fluid coupling of the shear type wherein the outer periphery of the input coupling member is provided with notches which are triangular in cross section and where the leading edges of the notches are formed by the intersection of the outer periphery of the input member and a non-radially extending surface portion defining one surface of the notch.

Further objects and advantages of the present invention will be apparent to those skilled in the art to which it relates from the following description thereof made with reference to the accompanying drawings forming a part of this specification, and in which:

FIG. 1 is a vertical transverse sectional view of a fluid coupling embodying the present invention;

FIG. 2 is a fragmentary cross-sectional view of the fluid coupling shown in FIG. 1 taken approximately along the section line 2—2 thereof;

FIG. 3 is a sectional view of the fluid coupling shown in FIG. 1 taken approximately along the section line 3—3 thereof;

FIG. 4 is an enlarged fragmentary sectional view of a portion of the fluid coupling shown in FIG. 1; and FIG. 5 is a fragmentary sectional view of a portion of the fluid coupling shown in FIG. 4 taken approximately along the section line 5—5 of FIG. 4.

The present invention provides a new and improved fluid coupling of the type including relatively rotatable coupling members having a fluid shear space therebetween and which are co-operable with a fluid shear medium within the shear space to provide a shear type fluid drive therebetween. Fluid couplings of this type may be used for driving various different kinds of load devices but have their primary use in driving vehicle engine accessories. The preferred embodiment of the present invention is shown in the drawings as forming a drive for a fan cooling accessory device for an internal combustion engine, not shown.

The preferred embodiment of the present invention is illustrated as a fluid coupling device 10. The coupling 10 includes an input coupling member 11, an output coupling member 12, and cooling fan blades 14 and 15 which are driven from the engine through the fluid coupling 10. The fluid coupling 10 also includes an input shaft member 17 on which the input coupling member 11 is mounted and which is rotatable as by a belt drive including a pulley member 18, only a portion of which is shown in the drawings. The pulley member 18 is connected to the input shaft 17, at one end thereof, by suitable screws 19 which extend through flange portion 20 on the end of the shaft member 17 and through openings in the pulley member. The screws 19 are threaded into a hub plate 21 located on the side of the pulley 18 opposite from the flange portion 20 and are effective to clamp the pulley between the flange portion 20 and hub plate 21. The hub plate 21 has a central opening therethrough which communicates with an opening or passageway in the flange portion 20 which openings receive a stub shaft member 22 which is rotatably supported by the engine block and supports the coupling.

The input shaft member 17 has, intermediate its ends and adjacent the flange portion 20, an axially extending portion 23. The member 17 also has a reduced shaft portion 25 connected to the shaft portion 23 and functioning as a support for the inner race of a ball bearing assembly 30. Another shaft portion 31 is provided with surface serrations and a reduced diameter portion 32 connects the shaft portion 31 with a further shaft portion 33 at the end of the shaft 17 opposite the end having the flange portion 20.

The rotatable input or driving member 11 of the fluid coupling 10 is in the form of a disk having a hub portion 35 supported by the shaft 17. The hub portion 35 has an opening therethrough which has an interference fit with the shaft portions 31 and 33. The hub portion 35 is pressed onto the shaft 17 until the inner surface of the hub portion 35 abuts the side of the inner race of the ball bearing assembly 30, and thus prevents movement of the ball bearing assembly 30 to the left as viewed in FIG. 1. The outboard end of the shaft 17 is balled over or flared at 38 to positively retain the coupling member 11 on the shaft member 17. The input member 11 further includes a radially extending portion 36 connected to the hub portion 35. From the above description, it should be apparent that rotation of the shaft 17 causes the input coupling member 11 to be rotated.

The input coupling member 11 rotates in a fluid working or operating chamber 40 forming a part of a fluid chamber means 41 formed by the rotatable output or driven coupling member 12. The output coupling member 12 is in the form of a housing and includes a main housing member 42 having a hub portion 43 with an opening 44 therethrough. The opening 44 has an interference fit with the outer race of the ball bearing assembly 30 and is supported thereby for rotation about the axis of the shaft 17. A flange portion 45 engages the right side of the outer race of the ball bearing assembly 30, as viewed in FIG. 1, and restrains housing member 42 from movement in one axial direction. Preferably the outer race of the ball bearing assembly 30 is restrained from movement in the opposite axial direction by a rolled-over portion 46 of the housing member 42. The fan blades 14 and 15 are secured to surface portions 47 of the housing member 42 by stud and nut assemblies 48 so as to rotate with the housing member 42. The housing member 42 also includes a plurality of fin members located on the outer surface of the housing member 42 and functioning to cool the coupling 10.

The working chamber 40 formed by the output member 12 is defined by a cylindrical surface 50 coaxial with the shaft 17 and by end surfaces 51 and 52. The cylindrical surface 50 is provided by a bore in the housing member 42 and the end surface 52 is located at the bottom of the bore. The end surface 51 is provided by a partition member 53 in the form of a disk which extends transversely of the shaft 17 and the peripheral edge of which is secured to the housing member 42.

The input member 11 which rotates in the working chamber 40 has a surface portion spaced from the surface 52 of the housing member 42, defining a shear space 56 therebetween. The shear space 56 is defined by a plurality of axially extending cooperating grooves and lands on the surface 52 and the facing side of the input member which are designated generally 57. The grooves and lands 57 provide opposed surfaces extending in close parallel face to face relation and define a part of the intervening shear space 56 which lies on one axial side of the input member and extends from the outer periphery of the input member. Upon rotation of the disk 11 fluid in the fluid operating chamber 40 transmits torque from the disk 11 to the housing member 42, and specifically silicone fluid in the shear space 56 transmits torque between the adjacent surfaces of the input and output members by the shear action of the silicone fluid.

The amount of torque transmitted from the input member 11 to the output member 12 is a function of the volume and viscosity of the fluid in the chamber 40 and specifically in the above mentioned shear space 56. The fluid coupling 10 preferably includes a means for varying the volume of fluid in the shear space 56 so as to vary the torque transmitted. Any conventional and known structural arrangement may be provided for varying the volume of the fluid and the specific structure involved will not be described herein in great detail.

Generally, however, the fluid chamber means 41 includes a reservoir chamber 58 communicating with the operating chamber 40. The reservoir chamber 58 is defined by a disk shaped cover 59 secured to the housing 42. Means is provided for effecting fluid flow from the reservoir chamber 58 to the operating chamber 40 to increase the volume of fluid therein and from the operating chamber 40 to the reservoir chamber 58 to decrease the volume of fluid in the operating chamber. United States Patent No. 3,055,473 shows and describes a specific structure for providing for fluid flow between the reservoir chamber 58 and the working chamber 40 which structure may be incorporated herein.

The flow into and out of the working or operating chamber 40 is controlled by a helically wound bimetallic temperature-responsive coil 59a. One end of the helically wound bimetallic temperature-responsive coil is retained in position on the cover 59 and the other end is positioned in a slot formed in a stub shaft 60 rotatably supported by the cover member 59 coaxial with shaft 17. One end of the shaft 60 extends into the reservoir chamber 58, and the other end of the stub shaft 60 receives the end of the bimetallic coil and is pinched together so as to hold the end of helically wound coil onto the stub shaft. An arm member 61 is suitably secured to the end of the stub shaft 60 which extends into the reservoir chamber 58 for rotation therewith. The arm member 61 extends sufficiently to cover an opening 62 in the partition member, which opening communicates chambers 58 and 40. The arm member 61 is moved upon changes in temperature between its dash-dash position 61a covering opening 62 and its dash-dash position 61b wherein it does not cover opening 62 as shown in FIG. 3.

The coil 59a expands or contracts upon changes in temperature, depending upon whether there is an increase or decrease in the temperature. When the coil expands or contracts it rotates the shaft 60 and also rotates the arm member 61 between its positions 61a, 61b. Upon a temperature increase, the coil 59a expands and causes rotation of the member 61 to its position 61b, in which position arm member 61 does not cover or block opening 62 in the partition member. Upon a reduction in temperature the coil 59a contracts and the arm member 61 is moved thereby to its position 61a. When arm member 61 is in the position 61a, it blocks the flow of fluid through opening 62. When the arm member is in position 61b, it allows for the flow of fluid through the opening 62 in the partition member 53, and fluid then flows from the reservoir chamber 58 into the working chamber due to the centrifugal head or pressure of the fluid in the reservoir chamber. At intermediate positions of the arm member 61, a certain amount of fluid flows into the working chamber 40 due to the centrifugal head depending upon the amount of opening 62 that is unblocked. When fluid flows into the operating chamber, there is an increase of fluid therein until an equilibrium condition is attained between the fluid chambers.

Fluid flow is effected from the working chamber 40 into the reservoir chamber 58 through the fluid passageways 63, 64 in the cover member by a pair of pumping or impact elements 65, 66, respectively, supported by and formed integrally with the partition member 53. The pumping elements 65, 66 project into the working chamber 40 on the axial side of the input member opposite the shear space 56 and are positioned in the working chamber radially outwardly of the interfitting lands and grooves 57 and are diametrically opposed. The fluid conducting passageways 63, 64 open into the working chamber 40 adjacent to the pumping elements 65, 66, respectively. The input member 11 is provided with a wiper step 67 in the axial side thereof adjacent the pumping elements. The pumping elements 65, 66 interfit with the wiper step and overlap a portion of the axial extent of the input member and the outermost radially spaced surface of the pumping element is immediately adjacent the surface 50 of the output member. The passageways 63, 64 are spaced circumferentially from the pumping elements 65, 66, respectively, so as to trail the pumping elements 65, 66, respectively, upon rotation of the coupling members. The direction of rotation of the input and output coupling members is indicated by the arrows in the drawings.

The input member 11 being the driving member, rotates at a speed faster than the speed of the output member 12 and thus causes fluid to be impacted against the axially extending surfaces 65a, 66a of the pumping elements 65, 66. This causes a pressure to build up adjacent the surfaces 65a, 66a, which pressure is directed by the passageways 63, 64, respectively, into the reservoir chamber 58.

Fluid continually flows through passages 63, 64 by the above described action of the pumping elements 65, 66, and in the event the opening 62 is covered by the arm member 61, fluid does not flow into the working chamber 40 and thus there is a decrease in the amount of fluid in the working chamber 40 and an increase in the speed differential between the input and output members. However, in the event that the opening 62 is opened, fluid flows therethrough into the working chamber 61 at a faster rate than it flows through the passages 63, 64 into the reservoir chamber, and therefore there is a net increase in the volume of fluid in the working chamber 61 and a decrease in the speed differential between the input and output members. As noted above, the fluid in the working chamber increases until equilibrium is attained where flow into and out of the working chamber is equal.

According to the present invention, the fluid coupling 10 is operable to retard acceleration of the output coupling member upon acceleration of the input coupling member and also is capable of achieving an extremely low idle speed for the output coupling member when the engine is operating at its idle speed. The modification shown in FIGS. 1 to 4 includes, in addition to the means for effecting fluid flow between the operating and reservoir chambers, as described above, means for pumping fluid from the fluid shear space 56 on one axial side of the input member to the opposite side thereof under certain operating conditions as will be described herein below. More specifically, notch means is formed on the outer periphery of the input member. The notch means comprises pumping slots 70 provided on the outer periphery of the input member, and as shown in the drawings, two pumping slots 70 are provided at diametrically opposed portions of the outer periphery of the input member.

The pumping slots 70 extend entirely across the outer periphery of the input member and communicate with the shear space 56 and with the portion of the operating chamber 40 adjacent the partition 53 intersecting the wiper step 67. The slots 70 extend at a 45 degree angle to the axial faces of the input member 11 and extend at a 45 degree angle to the direction of rotation of the input member. The portion of each pumping slot communicating with shear space 56 upon rotation of the input member 11 is in advance of the other portions of the slot, and the trailing portion of each slot is the portion communicating with the operating chamber adjacent the partition member 53. As best shown in FIG. 5, the pumping slots 70 are triangular in cross section and the leading edge 71 thereof is defined by the intersection of a nonradial surface 73 defining a portion of the notch and the periphery of the input member and which extends downwardly at an angle into the input member. The pumping slot 70 is further defined by a substantially radially extending surface 75 which intersects the periphery of the input member and meets or intersects the tapered surface 73 thereof at the base or apex 76 of the notch. From the above description it should be apparent that the pumping slots 70, due to their inclination with respect to the direction of rotation of the input member, function to pump fluid axially of the fluid coupling from the shear space 56 to the side of the input member opposite the shear space 56.

As stated hereinabove, the pumping slots 70 effectively provide an extremely low output speed at low engine speeds. It is believed that the slots 70, at low engine idle speeds, when the input coupling member 11 is rotating at a relatively slow rate, and when the temperature sensing mechanism is positioned so that no fluid is flowing into the operating chamber, function to substantially eliminate fluid from the shear area 56. The fluid pumped from the shear space 56 flows to the wiper step and is impacted against the impact pumping elements and flows into the reservoir chamber. By evacuating fluid from the shear space 56, a substantial reduction in the amount of fluid transmitting torque between the input coupling member and output coupling member is effected, and as a result an extremely low idle speed of the output coupling member is achieved. The pumping slots 70, however, do not remove the fluid from the outer periphery of the input coupling member as shown in FIG. 4 wherein the condition of the fluid coupling, at idle speed is illustrated. The fluid which remains between the outer periphery of the input coupling member and the output member functions as an oil bearing which tends to support the input member for rotation in the operating chamber and prevents vibration of the input member and the problems which result therefrom. Moreover, this residual fluid does transmit torque from the input member to the output member and thus while the idle speed is exeremely low, it is not entirely eliminated.

In operation, the pumping slots 70 also function to retard acceleration of the output member upon acceleration of the input member. As noted above, for a given position of arm member 61, a given level of fluid in the shear space 56 and operating chamber is achieved. In such an equilibrium condition, if the input member is accelerated, the centrifugal head or pressure of the fluid in the operating chamber is increased and the pumping slots 70 rotate at an increased speed. The pumping slots, due to the increased speed thereof, function to pump fluid from the shear space 56 to the opposite axial side of the input coupling member. This pumping action and the increased centrifugal head in the operating chamber destroys the equilibrium condition and fluid flows from the operating chamber. In this manner, the pumping slots 70 reduce the amount of fluid in the shear space 56 and thereby reduces the transmission of torque to the output member and thus retard or delay acceleration of the output member. The output member will accelerate but at a slower rate than the input member. Thus, fan noise due to acceleration will lag behind engine noise. As the output member accelerates, the centrifugal force in the reservoir chamber is increased and fluid may flow back into the operating chamber and equilibrium will be again achieved. It is believed that in the event the fluid coupling is in a non-equilibrium condition as when actuated so as to effect transmission of silicone fluid from the reservoir into the operating chamber, and the input member is accelerated, the pumping slots 70 retard or slow the rate of fluid flow into the shear space 56 and as a result retard or delay acceleration of the output member. From the above description, it should be readily apparent that the pumping slots 70 function to retard acceleration of the output coupling member upon acceleration of the input coupling member and, in this manner, fan noise due to acceleration of the output coupling member lags behind engine noise, and thus the engine noise hides the fan noise.

The above description of the preferred embodiment of the present invention has been made in considerable detail and it should be understood that certain modifications, changes and adaptations thereof may be made by those skilled in the art to which it refers, and it is hereby intended to cover all such modifications, changes and adaptations which fall within the scope of the appended claims.

Having described my invention, I claim:

1. A fluid coupling of the shear type comprising relatively rotatable coupling members, one of said coupling members defining a fluid working chamber and the other of said coupling members being rotatable in said fluid working chamber, said coupling members having opposed spaced surfaces providing a fluid shear space therebetween and co-operable with a fluid shear medium in said shear space to transmit torque between the coupling members, a reservoir chamber communicating with said working chamber, means for effecting fluid flow into said shear space from the reservoir chamber to vary the torque transmitted between said input and output coupling members, and notch means provided on the outer periphery of the other coupling member and operable to retard the rate of fluid flow from the reservoir chamber into said shear space.

2. A fluid coupling of the shear type comprising relatively rotatable coupling members, one of said coupling members defining a fluid working chamber and the other of said coupling members being rotatable in said fluid working chamber, a reservoir chamber communicating with said operating chamber, said coupling members having opposed spaced surfaces providing a fluid shear space therebetween and co-operable with a fluid shear medium in said shear space to transmit torque between the coupling members, means for providing fluid flow between said reservoir and working chamber and into said shear space, and pumping notch means provided on the outer periphery of the other coupling member and operable to retard the rate of fluid flow provided by said means into said shear space, said pumping notch means comprising a plurality of slots in the outer periphery of the other coupling member.

3. A fluid coupling of the shear type as defined in claim 2 wherein each of said plurality of slots extends axially of said other member and intersects the opposite axial surfaces thereof and is operable to pump fluid from one axial side of the other member to the other axial side thereof.

4. A fluid coupling of the shear type as defined in claim 2 wherein said pumping slots are of a uniform cross section and extend at an acute angle to the direction of rotation of the coupling members.

5. A fluid coupling of the shear type comprising a first coupling member defining a fluid operating chamber and a fluid reservoir chamber, a second coupling member rotatable in said operating chamber, means for effecting fluid flow between said chambers including a radially extending pumping element carried by said first coupling member and located in said operating chamber, said pumping element overlapping at least a portion of the axial extent of said second coupling member and having its radial outermost portion immediately adjacent the surface of said first coupling member defining said operating chamber, and means for retarding the rate of fluid flow to the axial side of said second coupling member remote from said pumping element and operable to pump fluid from said remote axial side to the side adjacent said pumping element.

6. A fluid coupling of the shear type comprising a first coupling member definig a fluid operating chamber and a fluid reservoir chamber, a second coupling member rotatable in said operating chamber, means for effecting fluid flow between said chambers including a radially extending pumping element carried by said first coupling member and located in said operating chamber, said pumping element overlapping at least a portion of the axial extent of said second coupling member and having its radial outermost portion immediately adjacent the surface of said first coupling member defining said operating chamber, and means for retarding the rate of fluid flow to the axial side of said second coupling member remote from said pumping element and operable to pump fluid from said remote axial side to the side adjacent said pumping element including a plurality of slots formed in the outer periphery of said second coupling member and extending at an acute angle to the direction of rotation of the coupling members and each of said slots having a triangular transverse shape.

7. A fluid coupling of the shear type comprising relatively rotatable coupling members, one of said coupling members defining a fluid working chamber and the other of said coupling members being rotatable in said fluid working chamber, said coupling members having opposed spaced surfaces providing a fluid shear space therebetween and cooperable with a fluid shear medium in said shear space to transmit torque between the coupling members, and pumping notch means provided on the outer periphery of the other coupling member and operable to pump fluid from said shear space, said pumping notch means comprising a plurality of slots in the outer periphery of the other coupling member, said pumping slots being of a uniform cross section and extending at an acute angle to the direction of rotation of the coupling members, said slots further being triangular in transverse shape and having a radially extending surface defining a portion thereof.

8. A fluid coupling of the shear type comprising relatively rotatable coupling members, one of said coupling members defining a fluid working chamber and the other of said coupling members rotatable in said working chamber, said members having opposed spaced surfaces providing a fluid shear space therebetween and cooperable with a fluid shear medium in said shear space to transmit torque between the coupling members, flow actuating means operable to effect fluid flow into and from said shear space to vary the torque transmitted between said coupling members, pumping notch means provided on the outer periphery of the other coupling member and operable to retard the rate of fluid flow into said shear space and operable to pump fluid from said shear space, said pumping notch means including at least one slot in the outer periphery of said other member, said slot having a uniform cross section and extending at an acute angle to the direction of rotation of the coupling members.

References Cited by the Examiner

UNITED STATES PATENTS

| | | | |
|---|---|---|---|
| 3,007,560 | 11/1961 | Weir | 192—58 |
| 3,135,370 | 6/1964 | Sutton | 198—58 |
| 3,174,600 | 3/1965 | Oldberg | 198—58 |
| 3,191,733 | 6/1965 | Weir | 192—58 |

DAVID J. WILLIAMOWSKY, *Primary Examiner.*

DON A. WAITE, *Examiner.*

A. T. McKEON, *Assistant Examiner.*